United States Patent [19]

Bravet et al.

[11] Patent Number: 5,039,573
[45] Date of Patent: Aug. 13, 1991

[54] POLYURETHANE LAYER POSSESSING ENERGY-ABSORBING PROPERTIES AND ITS USE IN SAFETY GLASS

[75] Inventors: Jean-Louis Bravet; Sylvie Drujon, both of Thourotte, France

[73] Assignee: Saint-Gobain Recherche, Aubervilliers, France

[21] Appl. No.: 495,910

[22] Filed: Mar. 20, 1990

[30] Foreign Application Priority Data

Mar. 20, 1989 [FR] France ................... 89 03585

[51] Int. Cl.$^5$ .................. B32B 27/40; C08G 18/10
[52] U.S. Cl. ................ 428/423.1; 428/425.6; 528/59; 528/67
[58] Field of Search ........... 428/423.1, 423.3, 425.6; 528/59, 67

[56] References Cited

U.S. PATENT DOCUMENTS 4,891,271  2/1990  Bravet et al. ............ 428/423.1

Primary Examiner—P. C. Sluby
Assistant Examiner—Don Sumihiro
Attorney, Agent, or Firm—Oblon, Spivak, McClelland, Maier & Neustadt

[57] ABSTRACT

A polyurethane-based sheet of high optical quality having energy-absorbing properties, obtained by the reactive pouring or spraying, on a flat, horizontal base, of a reactive mixture of an isocyanate component and a polyhydric alcohol component is disclosed. The ratio of the NCO equivalent isocyanate groups to the OH equivalent groups used in approximately equal to 1. The isocyanate component comprises a mixture of 3-isocyanatomethyl-3,5,5-trimethylcyclohexylisocyanate (isocyanate I) and bis-4-isocyanatocyclohexylmethane (isocyanate II), in a proportion of an isocyanate (I) NCO equivalent of 0.1 to 0.8, and of an isocanate (II) NCO equivalent, with the total NCO equivalent being about 1.

The layer according to the invention is used in laminated glass containing at least one sheet of glass and one layer of a plastic material.

7 Claims, 1 Drawing Sheet

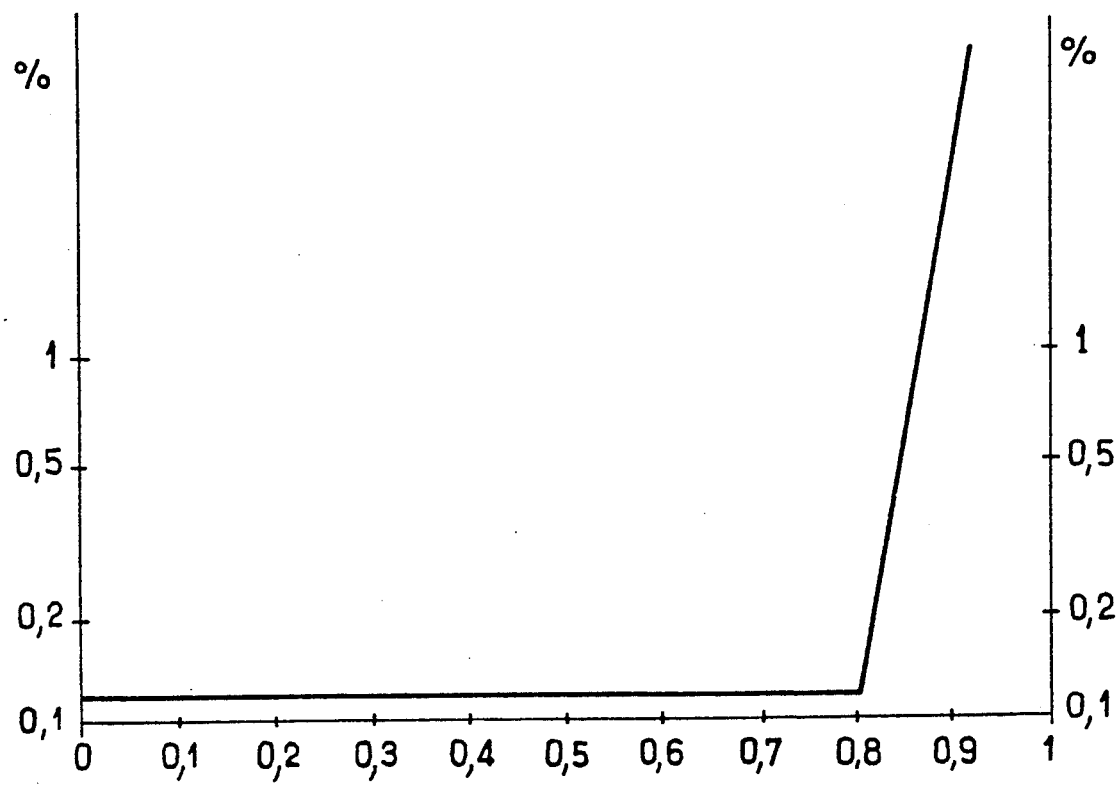
FIG._1
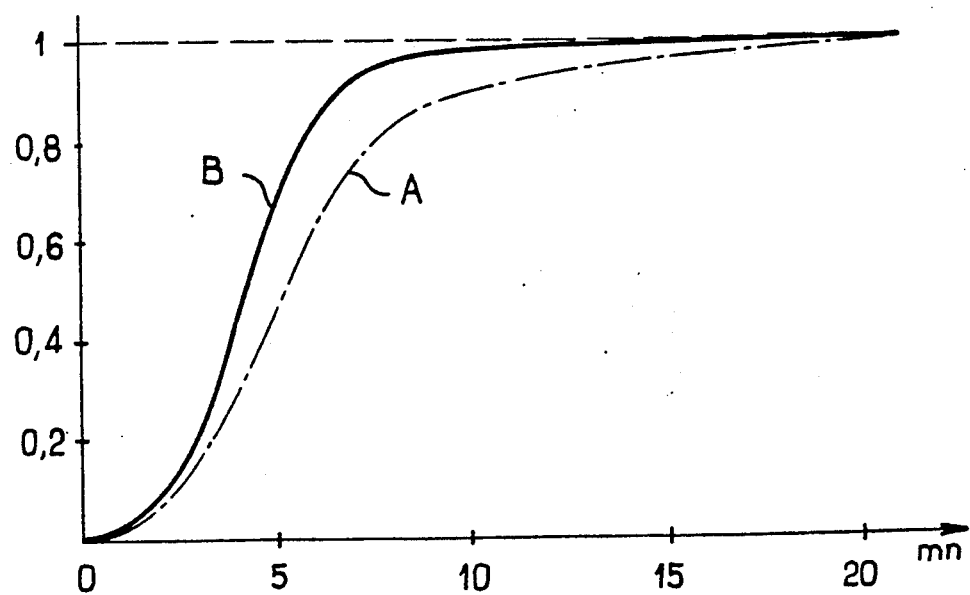
FIG._2

5,039,573

POLYURETHANE LAYER POSSESSING ENERGY-ABSORBING PROPERTIES AND ITS USE IN SAFETY GLASS

BACKGROUND OF THE INVENTION

1. Field of the Invention

The invention relates to layers of an energy absorbing, transparent, high optical quality, plastic material suitable for use in laminated glass comprised of a sheet of glass and at least one layer of the plastic material, e.g., vehicle windshields.

2. Discussion of the Background

Layers of plastic materials having energy-absorbing properties have already been described in European Patent Publication EP-0 133 090. These layers are formed during a continuous process involving the reactive pouring, on a horizontal flat base, a reactive mixture composed of an isocyanate constituent and an active hydrogen constituent. The active hydrogen constituent is especially a polyhydric alcohol constituent. The isocyanate constituent contains at least one aliphatic or cyclo-aliphatic diisocyanate or a diisocyanate prepolymer. This constituent has a viscosity of less than approximately 5 Pas at +40° C. The polyhydric alcohol constituent contains at least one long difunctional polyhydric alcohol having a molecular weight of between 500 and 4,000, and at least one short diol acting as a chain-elongating agent. The term "reactive pouring" means pouring, in the form of a layer or film, a fluid mixture of constituents in the monomer or prepolymer state, followed by the heat polymerization of this mixture.

The proportions of the polyurethane constituents are chosen so as to obtain, preferably, a stoichiometrically-balanced system. That is, the ratio of the NCO equivalent groups supplied by the diisocyanate constituent to the OH equivalent groups supplied by the polyhydric alcohol(s) or the short diols, is approximately 1.

Appropriate diisocyanates are chosen, in particular, from among the following difunctional aliphatic isocyanates: hexamethylenediisocyanate (HMDI), 2,2,4-trimethyl-1, 6-hexanediisocyanate (TMDI), bis-4-isocyanatocylcohexylmethane, 2,2-bis(4-isocyanatocyclohexyl propane (IPDI), m-xylylenediisocyanate (XDI), m and p-tetramethylxylylenediisocyanate (m- and p- TMXDI), trans-cyclohexane-1,4-diisocyanate (CHDI), 1,3-(diisocyanatomethyl) cyclohexane (hydrogenated XDI). IPDI and IPDI containing urea functions are preferred.

Heat polymerization of these preferred, IPDI-based layers uses a thermal cycle normally consisting of at least 20 minutes at a temperature of approximately 120° C., which thus involves a long polymerization tunnel in the case of continuous reactive pouring. Efforts have not been made to shorten this polymerization cycle, for reasons of cost and line length.

One of the most widely-used diisocyanates in the manufacture of thermoplastic polyurethane layers, which is also the most frequently cited in the literature, for example in U.S. Pat. No. 3,620,905, is bis-4-isocyanatocyclohexylmethane, marketed, for example, under the names Hylene W or Desmodur W. Reactivity is one of the reasons for its extensive use. However, tests conducted by the inventors have shown that its use in a reactive pouring process under normal pouring temperature conditions, i.e., of approximately 40°, to manufacture a polyurethane layer having energy-absorbing properties, always led to a layer exhibiting a haze. Considered from an optical perspective, this made the layer unsatisfactory.

The haze can be avoided by pouring the reactive mixture at a much higher temperature, for example of about 120° or more. However, at that temperature polymerization occurs too rapidly and takes place prematurely in the pouring head. As a consequence, optical defects, such as striae, form on the layer.

SUMMARY OF THE INVENTION

The invention provides a new polyurethane layer having energy-absorbing properties (designated hereinafter the EA layer) and high optical quality obtained by reactive pouring, and which, in addition, can be polymerized more rapidly than the conventional layers using this method.

The layer possessing energy-absorbing properties according to the invention is formed by reactive pouring or spraying of an isocyanate constituent and a polyhydric alcohol constituent in proportions corresponding to a ratio of isocyanate groups (NCO) equivalents to hydroxyl groups (OH) equivalents equal to approximately 1. The isocyanate constituent used is a mixture of 3-isocyanatomethyl-3,5,5-trimethylcyclohexylisocyanate (IPDI) (I) and bis-4-isocyanatocyclohexylmethane (II), in an amount of an isocyanate (I) equivalent of from 0.1 to 0.8 and of an isocyanate (II) equivalent of from 0.9 to 0.2, for a total isocyanate equivalent of 1.

BRIEF DESCRIPTION OF THE FIGURES

FIG. 1 sets forth the percent haze (measured according to European standard R43) for sheets prepared in accordance with the present invention as a function of the amount of bis-4-isocyanatocyclohexylmethane (II) used.

FIG. 2 illustrates the reactivity of the isocyanate mixture over the present invention in comparison to the reactivity of 3-isocyanatomethyl-3,5,5-trimethylcyclohexylisocyanate (I).

DETAILED DESCRIPTION OF THE PREFERRED EMBODIMENTS

When the mixture of isocyanates contains more than an isocyanate equivalent (II) of 0.9, the layer obtained is hazy. When the mixture of isocyanates contains less than a 0.2 equivalent of the same isocyanate (II), the reaction kinetics are not significantly improved.

The mixture of isocyanates according to the invention makes it possible, surprisingly, to eliminate the haze observed when bis-4-isocyanatocyclohexylmethane (II) is used alone, even when this isocyanate is the main constituent of the isocyanate mixture, while improving the kinetics of the polymerization of the EA layer.

Preferred mixtures are formed from the two isocyanates used in the following proportions, which are expressed in isocyanate equivalents, 0.2 to 0.5 supplied by isocyanate (I) and 0.8 to 0.5 supplied by isocyanate (II). The sum of the equivalents supplied by isocyanates (I) and (II) is always equal to about 1 for 1 hydroxyl equivalent.

In addition to the improved polymerization kinetics and the high optical quality of the layer according to the invention, this layer possesses good mechanical characteristics, which may even surpass those of the layers formed from isocyanate (I) or isocyanate (II) alone. These mechanical properties are, in particular, rupture strength and elongation, which generally confer on the glass incorporating this layer better resistance to penetration.

Isocyanate (I) can contain urea moieties in the proportion of 0 to 10% by weight and, preferably, 5 to 7% by weight. The urea moieties can improve some of the mechanical properties of the polyurethane layer.

The polyhydric alcohol constituent used to form the layer according to the invention contains a long polyhydric alcohol, a chain extender, and a small proportion of a polyhydric alcohol whose functionality is greater than 2.

Suitable long polyhydric alcohols are selected from among the polyetherdiols or polyester diols having a molecular weight (=$\overline{M}w$ in the text) of between 500 and 4,000. The polyester diols can be the products of the esterification of a diacid such as adipic, succinic, palmitic, azelaic, sebacic, or opthalic acid, and a diol such as ethyleneglycol, propanediol-1,3, butanediol-1,4, hexanediol-1,6, polyetherdiols having the general formula H—O—CH$_2$—$_n$—$_m$OH, in which n=2 to 6 and m is such that the molecular weight falls between 500–4,000, or polyetherdiols having the general formula:

H—O—CH(CH$_3$)—CH$_2$—$_m$OH in which m is such that the molecular weight falls between 500 and 4,000. Or polycaprolactone-diols may be used.

Preference is given to the use of a polytetramethylene glycol (n=4) with a molecular weight of 1,000.

The suitable chain-extending agents are short diols with a molecular weight ($\overline{M}w$) of less than about 300, and preferable less than 150, such as: ethyleneglycol, propanediol-1,2, propanediol-1,3, butanediol-1,2, -1,3, -1,4, dimethyl-2,2-propanediol- 1,3 (neopentylglycol), pentanediol-1,5, hexanediol-1,6, octanediol-1,8, decanediol-1,10, dodecanediol-1,12, 1,2-, 1,3-, or 1,4-cyclohexanedimethanol, bisphenol A, methyl-2 pentanediol-2,4, methyl 3-pentenediol-1,3, diethyleneglycol, triethyleneglycol, tetraethyleneglycol, butyne-2-diol-1,4, butenediol-1,4 and substituted and/or etherfied decynediol, hydroquinone-bis-hydroxyethylether, bisphenol A etherfied by two or four groups of propylene oxide, and dimethylolpropionic acid. Preference is given to the use of butanediol-1,4.

The polyhydric alcohol with a functionality greater than two may be selected from among the monomer aliphatic triols, such as glycerol, trimethylpropane, triols having polyether chains, polycaprolactone triols (the molecular weight ($\overline{M}w$) of these triols ranging generally between 90 and 1,000), mixed polyether/polyester polyhydric alcohols with a functionality greater than 2, for example a functionality of between 2 and 3.

The proportions between the long polyhydric alcohol, and short diol, and the polyhydric alcohol with a functionality greater than 2 may vary depending on the properties desired. Generally, proportions are chosen such that, for an hydroxyl equivalent, the long polyhydric alcohol represents approximately a 0.30 to 0.40 equivalent, the short diol an equivalent of approximately 0.2 to 0.7, and the polyhydric alcohol having a functionality greater than 2, an equivalent of approximately 0.05 to 0.35.

The EA layer according to the invention is advantageously used by being combined with a self-sealing cover layer which is resistant to scratches and abrasion. This self-sealing cover layer, made of a plastic material, which can, when applied according to the invention, be called the internal protection layer (IP layer), is, for example, the one described in French Patent Publication Nos. 2 187 719, 2 251 608, or 2 574 396.

Under normal temperature conditions, this self-sealing layer has a high elastic deformation capacity, a low modulus of elasticity of less than 2,000 daN cm$^{-2}$ (and preferably less than 200 daN cm$^{-2}$), and an elongation at rupture of more than 60%, with less than 2% plastic deformation (and preferable, an elongation at rupture of more than 100%, with less than 1% plastic deformation). The preferred layers of this kind are duroplastic polyurethanes having a modulus of elasticity of approximately 25 to 200 daN cm$^{-2}$ and an elongation of approximately 100 to 200%, with a plastic deformation of less than 1%.

Examples of monomers which are suitable for the preparation of these duroplastic polyurethanes are, on the one hand, difunctional aliphatic isocyanates such as 1,6-hexanediisocyanate, 2,2,4-trimethyl-1,6-hexanediisocyanate, 2,4,4-trimethyl-1,6-hexanediisocyanate, 1,3-bis(isocyanatomethyl)benzene, bis(4-isocyanatocyclohexyl)methane, bis(3-methyl-4-isocyanatocyclohexyl)methane, 2,2-bis(4-isocyanatocyclohexyl)propane, 3-isocyanatomethyl-3,5,5-trimethylcyclohexyl) propane, and 3-isocyanatomethyl-3,5,5-trimethylcyclohexylisocyanate, as well as biurets, isocyanurates and prepolymers of these compounds which have a functionality of 3 or more; and, on the other hand, polyfunctional polyhydric alcohols like branched polyhydric alcohols such as polyester polyhydric alcohols and polyether polyhydric alcohols obtained by the reaction of polyfunctional alcohols, in particular 1,2,3-propanetriol (glycerol), 2,2-bis(hydroxymethyl)-1-propanol (trimethylolethane), 2,2-bis(hydroxymethyl)-1-butanol (trimethylolpropane), 1,2,4-butanetriol, 1,2,6-hexanetriol, 2,2-bis(hydroxymethyl)-1,3-propane-diol (pentaerythritol) and 1,2,3,4,5,6- hexanehexol (sorbitol), with aliphatic diacids like malonic acid, succinic acid, glutaric acid, adipic acid, suberic acid and sebacic acid, or with cyclical ethers such as ethylene oxide, 1,2-propylene oxide, and tetrahydrofuran.

The molecular weight ($\overline{M}w$) of the branched polyhydric alcohols is, advantageously, approximately 250 to 4,000, and preferably approximately 450 to 2,000. Mixtures of various polyisocyanates and monomer polyhydric alcohols may be used. A duroplastic polyurethane especially preferred is that described in French Patent Publication No. 2 251 608.

The layer having energy-absorbing properties may contain various additives. It may contain a tin-based catalyst, for example tin dibutyldilaurate, tributyltin, tin octoate, or an organomercuric catalyst, for example phenylmercuric ester, an amine catalyst, for example diazabicyclo [2.2.2]-octane, 1,8-diazabicyclo-[5.4.0]-1-decene-7.

The layer may contain a stabilizing agent such as bis(2,2,6,6-tetramethyl-4 piperidyl)sebacate, a phenolic oxidation inhibitor.

The layer may also incorporate a coating agent such as a silicone resin, a fluroralkylated ester, or an acrylic resin.

Other advantages and characteristics of the EA polyureathane layer according to the invention will emerge in the following description of examples of manufacture of the layer and of laminated glass which uses it.

EXAMPLE 1

To manufacture the layer having energy-absorbing properties, the polyhydric alcohol constituent is prepared beforehand, by mixing a polytetramethylene glycol having a molecular weight ($\overline{M}w$) of 1,000, butanediol-1,4, and a polyhydric alcohol with a functionality greater than 2, e.g., the product marketed under the name Desmophen 1140, which has a functionality of between 2 and 3. The proportions between the constituents used are such that the polytetramethyleneglycol supplies an hydroxyl group equivalent of 0.35, the butanediol-1,4 supplies an equivalent of 0.55, and the polyhydric alcohol having a functionality greater than two supplies 0.1 equivalent.

A stabilizing agent is incorporated into the polyhydric constituent in a proportion of 0.5% by weight of the total weight of the polyhydric alcohol constituent, a coating agent in the proportion of 0.05% by weight computed in the same fashion, and a catalyst, i.e., dibutyltin dilaurate in a proportion of 0.02% by weight, calculated as described above.

The isocyanate constituent used is a mixture of 3-isocyanatomethyl-3,5,5-trimethylcyclohexylisocyanate (IPDI) in a proportion of a 0.3 NCO equivalent, and bis-4-isocyanatocyclohexylmethane (Desmodur W) in a proportion of a 0.7 NCO equivalent, for a total of 1 NCO equivalent.

The constituents are added in quantities such that the ratio NCO/OH is 1.

After degassing the constituents in a vacuum, the mixture, raised to a temperature of approximately 40° C. is poured using a pouring head, like the one described in French Patent Publication No. 2 347 170 on a movable glass base which is continuously propelled forward, and covered with a separation agent, which may, for example, be the one described in French Patent Publication No. 2 383 000, i.e., a modified ethyene oxide additive. A layer approximately 0.6 mm thick is thus formed. This is subjected to a polymerization cycle comprising 15 minutes of heating at about 120°.

The layer is removed from the base. It is perfectly transparent.

EXAMPLE 2

The procedure is the same as in Example 1, except that the ratio of the two isocyanates is modified by taking a 0.1 isocyanate equivalent (I) and a 0.9 isocyanate equivalent (II).

The layer obtained is transparent.

COMPARATIVE EXAMPLE 1

The procedure is the same as in Example 1, except that only isocyanate I (one equivalent 1) is used.

The layer obtained is transparent, but polymerization is incomplete.

COMPARATIVE EXAMPLE 2

The procedure is the same as in Example 1, except that the only isocyanate II (one equivalent) is used.

The layer obtained is very hazy. The haze measured according to European Standard R 43, Paragraph 4 is 52%.

COMPARATIVE EXAMPLE 3

The procedure is the same as in Example 1, except that a mixture of isocyanates embodying a ratio corresponding to a 0.05 isocyanate (I) equivalent and a 0.95 isocyanate (II) equivalent is used.

The layer obtained is hazy. The haze is measured at 12%.

EXAMPLE 3

The procedure is the same as in Example 1, except that a mixture of isocyanates in a ratio corresponding to a 0.8 isocyanate (I) equivalent and a 0.2 isocyanate (II) equivalent is used.

The layer obtained is transparent.

EXAMPLE 4

The procedure is the same as in Example 1, except that, as the isocyanate (I), use is made of 3-isocyanatomethyl-3,5,5-trimethylcyclohexylisocyanate (IPDI) having urea moieties "(obtained by partial hydrolysis of the IPDI) and having an NCO group content of approximately 31.5% by weight, the equivalent number always being a 0.3 NCO equivalent and a 0.7 equivalent for isocyanate (II).

The layer obtained is transparent.

EXAMPLE 5

Before pouring the reactive mixture on the pouring base to form the EA layer, a duroplastic polyurethane layer is first produced on said base using a homogeneous mixture having the following properties:

1,000 g of a polyether having a molecular weight ($\overline{M}w$) of approximately 450, obtained by condensation of an oxide of 1,2-propylene with 2,2-bis(hydroxymethyl)-1-butanol and having a free hydroxyl radical content of approximately 10.5 to 12%, containing 1% by weight of a stabilizing agent, 0.05% by weight of a catalyst, i.e., dibutyltin dilaurate, and 0.1% by weight of a coating agent; and b 1,020 g of a biuret of 1,6-hexanediisocyanate having a free isocyanate radical content of approximately 23.2%.

An even layer is formed which, after polymerization, has a thickness of approximately 0.3 mm. The reactive mixture capable of forming the EA layer is poured on this first layer, as described in Example 1.

EXAMPLES 6-8

A duroplastic polyurethane layer is first formed, as described in example 5, on which reactive mixtures, like those described in examples 2, 3 and 4, are poured.

Measures of haze according to European Standard R 43 have been conducted for various layers produced with varying proportions of the two isocyanates. These measurements are given in FIG. 1, which shows that the haze, expressed in %, strongly increase beginning with an 0.8 isocyanate II equivalent, and that, beyond a 0.9 equivalent, the haze is too pronounced to allow the use of the layer in laminated glasses.

To highlight the reactivity of the isocyanate mixture according to the invention in comparison with isocyanate (I) alone, FIG. 2 illustrates the curve of the coefficient of progress of the polymerization reaction of the polyurethane layer as a function of the reaction time expressed in minutes on the pouring line. A coefficient of 1 corresponds to the complete polymerization of the layer. The rise of curve B, corresponding to the mixture of isocyanate (I) (equivalent of 0.3) and isocyanate (II) (equivalent 0.7) mixture is more rapid than that corresponding to isocyanate (I) (equivalent of 1) alone, which gives rise to a faster polymerization.

The EA layers according to the invention are used, as described above, preferably in combination with a duroplastic polyurethane layer which is resistant to scratches and abrasion, in the form of a sheet formed from two layers which can be assembled with a glass sheet so as to form the laminated safety glass.

Obviously, numerous modification and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A high optical quality polyurethane-based sheet having energy absorbing properties, obtained by reactive pouring or spraying, on a horizontal flat base, a reactive mixture comprised of (i) an isocyanate component having a viscosity of less than 5 Pas at +40° and of (ii) a polyhydric alcohol component:
   wherein said isocyanate component comprises 3-isocyanatomethyl-3,5,5-trimethylcyclohexylisocyanate (I) and bis-4-isocyanatocyclohexylmethane (II), present in a proportion, measured as NCO isocyanate equivalents, of 0.1 to 0.8 for (I) and of 0.9 to 0.2 for (II), for a total of 1 NCO equivalent;
   wherein said polyhydric alcohol component comprises (iia) at least one long difunctional polyhydric alcohol having a molecular weight ($\overline{M}w$) of between 500 and 4,000, (iib) at least one short diol with a molecular weight of less than 300, and (iic) at least one polyhydric alcohol having a functionality greater than 2, and
   wherein the ratio of the NCO isocyanate group equivalents to the OH hydroxyl group equivalents in said mixture is equal to about 1.

2. The sheet of claim 1, comprising using 0.2 to 0.5 NCO equivalents of (I) and 0.8 to 0.5 NCO equivalents of (II).

3. The sheet of claim 1 comprising using (a) about 0.7 NCO equivalents of (I) and about 0.3 NCO equivalents of (II), and (b) as said polyhydric alcohol component a mixture of (b1) polytetramethyleneglycol having a molecular weight ($\overline{M}w$) of approximately 1,000 in a proportion of 0.30 to 0.40 of hydroxyl equivalents, (b2) butanediol-1,4 in an amount of from 0.2 to 0.7 hydroxyl equivalents, and (b3) a polyhydric alcohol with a functionality greater than 2, used in an amount of about 0.35 hydroxyl equivalents.

4. The sheet of claim 1, wherein said 3-isocyanatomethyl-3,5,5-trimethylcyclohexylisocyanate (I) contains urea moieties.

5. The sheet of claim 3, wherein said polyhydric alcohol having a functionality greater than 2 has a functionality of between 2 and 3.

6. A laminated sheet made of a high optical quality plastic material, wherein said sheet comprises an energy absorbing polyurethane layer according to claim 1 and a duroplastic polyurethane layer having scratch and abrasion resistant properties.

7. A laminated safety glass, comprising one glass sheet and one sheet of a plastic material according to claim 6.

* * * * *